US012572916B2

(12) United States Patent
Nagarajan et al.

(10) Patent No.: US 12,572,916 B2
(45) Date of Patent: Mar. 10, 2026

(54) DEVICES, SYSTEMS, AND METHODS FOR AUTOMATED WEIGHT SENSING AND LOGGING OF PREPARED FOODS FOR CHECKOUT

(71) Applicant: ZEBRA TECHNOLOGIES CORPORATION, Lincolnshire, IL (US)

(72) Inventors: Karthikeyan Nagarajan, Chennai (IN); Alessandro Bay, London (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 139 days.

(21) Appl. No.: 18/072,249

(22) Filed: Nov. 30, 2022

(65) Prior Publication Data

US 2024/0177132 A1 May 30, 2024

(51) Int. Cl.
*G06Q 20/20* (2012.01)

(52) U.S. Cl.
CPC ......... *G06Q 20/208* (2013.01); *G06Q 20/202* (2013.01); *G06Q 20/206* (2013.01)

(58) Field of Classification Search
CPC .. G06Q 10/087; G06Q 20/208; G06Q 20/206; G06Q 20/202

USPC ............................................... 705/28, 23, 15
See application file for complete search history.

(56) References Cited

U.S. PATENT DOCUMENTS

| | | | |
|---|---|---|---|
| 7,672,872 B2 * | 3/2010 | Shanton | H04L 67/125 705/28 |
| 7,973,642 B2 * | 7/2011 | Schackmuth | G07F 17/0078 340/10.51 |
| 2014/0001258 A1 * | 1/2014 | Chan | G07G 1/0081 235/385 |
| 2021/0365917 A1 * | 11/2021 | Tusia Cohen | G06K 7/10297 |

* cited by examiner

*Primary Examiner* — Ariel J Yu
*Assistant Examiner* — Denisse Y Ortiz Roman

(57) ABSTRACT

Devices, systems, and methods for weight-based tracking of prepared foods for affecting checkout. The devices, systems, and methods may include detecting, by one or more scale devices, a change in weight of a respective prepared food item stored at each of the one or more scale devices; controlling, by the respective scale device, a first transceiver of the respective scale device to transmit prepared food transaction data to a second transceiver of a user tray; storing, by the user tray, the transmitted prepared food transaction data in a memory slot at the second transceiver of the user tray; repeating the foregoing at each of the one or more scale devices at which a change in weight of a respective prepared food item is detected; and completing, by a transaction processing station, a checkout of the user tray.

19 Claims, 7 Drawing Sheets

_100a_

_400_

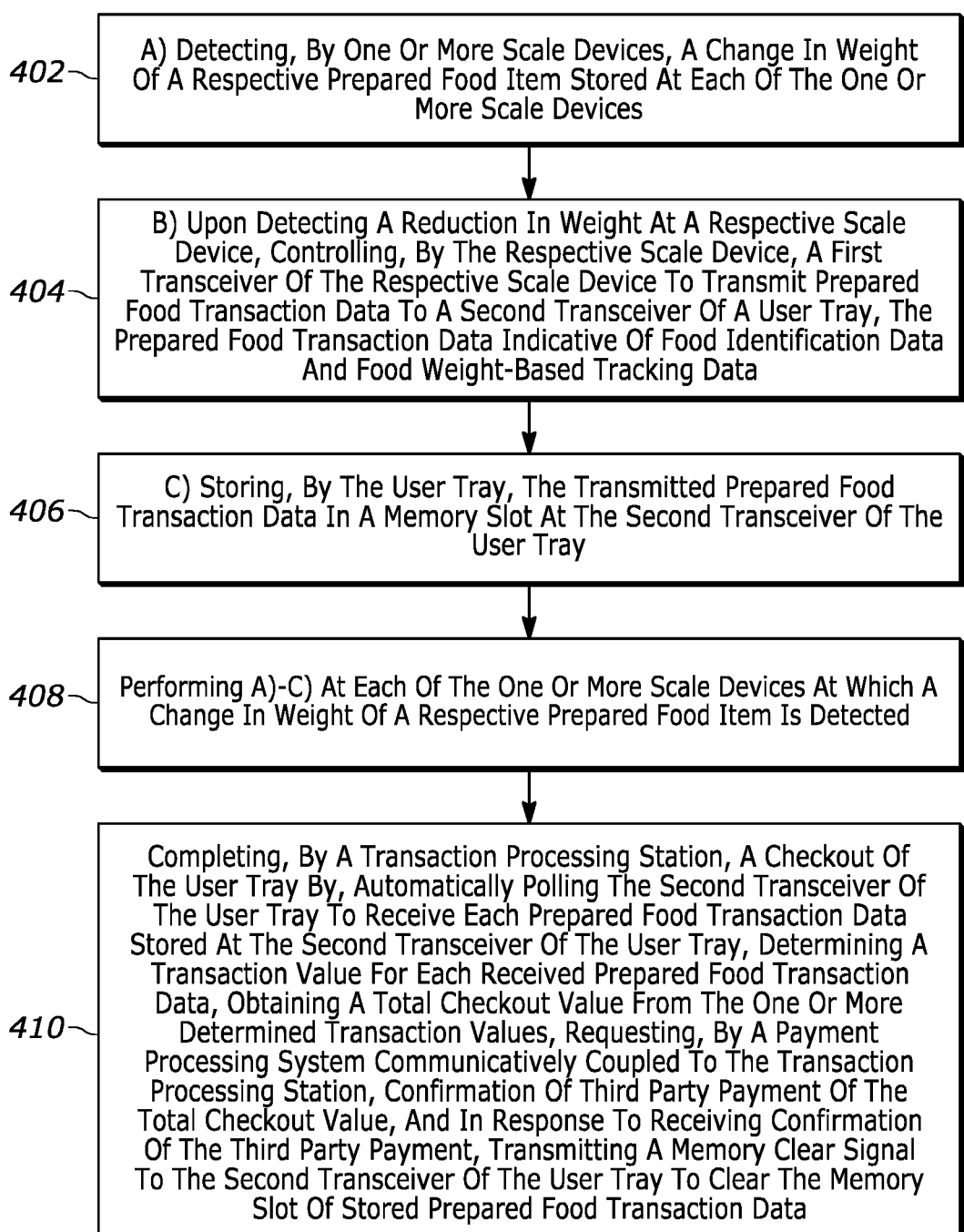

402 — A) Detecting, By One Or More Scale Devices, A Change In Weight Of A Respective Prepared Food Item Stored At Each Of The One Or More Scale Devices 404 — B) Upon Detecting A Reduction In Weight At A Respective Scale Device, Controlling, By The Respective Scale Device, A First Transceiver Of The Respective Scale Device To Transmit Prepared Food Transaction Data To A Second Transceiver Of A User Tray, The Prepared Food Transaction Data Indicative Of Food Identification Data And Food Weight-Based Tracking Data 406 — C) Storing, By The User Tray, The Transmitted Prepared Food Transaction Data In A Memory Slot At The Second Transceiver Of The User Tray 408 — Performing A)-C) At Each Of The One Or More Scale Devices At Which A Change In Weight Of A Respective Prepared Food Item Is Detected 410 — Completing, By A Transaction Processing Station, A Checkout Of The User Tray By, Automatically Polling The Second Transceiver Of The User Tray To Receive Each Prepared Food Transaction Data Stored At The Second Transceiver Of The User Tray, Determining A Transaction Value For Each Received Prepared Food Transaction Data, Obtaining A Total Checkout Value From The One Or More Determined Transaction Values, Requesting, By A Payment Processing System Communicatively Coupled To The Transaction Processing Station, Confirmation Of Third Party Payment Of The Total Checkout Value, And In Response To Receiving Confirmation Of The Third Party Payment, Transmitting A Memory Clear Signal To The Second Transceiver Of The User Tray To Clear The Memory Slot Of Stored Prepared Food Transaction Data

FIG. 4

DEVICES, SYSTEMS, AND METHODS FOR AUTOMATED WEIGHT SENSING AND LOGGING OF PREPARED FOODS FOR CHECKOUT

BACKGROUND

Traditionally, buffet style establishments (e.g., restaurants, cafeterias, and other eateries) charge customers on a fixed "all you can eat" rate. Under this system, a customer pays a fixed entrance fee (e.g., $20 USD) to enter the establishment, sometimes for a fixed time limit, and can eat as much as they want from the buffet. Occasionally, in this system, the customer would be monetarily penalized if they took more food than they could eat to discourage food waste and losses that would be sustained by the establishment. As a result, customers would overpay if they did not select the best food options in terms of monetary value and did not take the right amount of food. Similarly, establishments would also often be underpaid if savvy customers "gamed the system" and selected their most expensive food items at the right quantities.

In recent years, some buffet style restaurants, cafeterias, and other eateries began to charge customers in a "pay what you eat" system to address these issues. Under the "pay what you eat" system, customers place various food items and/or portions of various food items (e.g., two scoops of potato salad, 2 apples, 2 sausage links, one scoop of pasta, etc.) onto individual plates on their tray just as they did under the "all you can eat" system. In this system, however, the customer is charged after selecting their food items at a billing counter instead of upon entering the establishment. At checkout, the customer places the various plates onto an electronic scale that measures the weight of each plate. For items that are countable (fruits, bread, etc.), the weighting step is often skipped and the number of items are entered by the cashier. For other items that are billed based on weight (e.g., pasta, salads, rice, etc.), the scale measures the plate and bills the customer based on the weight per type of food item (for example, 1.5 lbs. of pasta equates to $5.25 USD).

However, the system breaks down when customers (regardless of intent) mix different food items and/or portions of food items onto the same plate. When multiple items are on the same plate, the billing counter cannot distinguish the weights of the various items on the plate thereby causing a blanketed fee to be charged based on the weight of the plate. In light of this known issue, some establishments forego item-plate segmentation altogether to expedite checkout and make the system simpler for customers. As such, it is not atypical for customers to either overpay (to their detriment) or underpay (to the establishment's detriment) when a blanketed fee is charged to the customer.

Additionally, even if items are not distinguished, the weighing process can still be time consuming, as each plate needs to be scanned individually. Further, spilling of food items might occur during the weighing process if the individual is not particularly dexterous or is pressured to move quickly by fellow customers in the checkout queue.

SUMMARY

Provided herein are devices, systems, and methods for the automated weight sensing and logging of prepared foods for checkout. One or more smart food stations may hold prepared food items, and one or more smart user trays may be available to customers. The one or more smart food stations may be able to accurately measure the weight of the prepared food items held at each respective smart food station.

A customer may operate one of the smart user trays and may visit any of the one or more smart food stations. When the customer transfers a prepared food item (and/or portion of a prepared food item) from one of the smart food stations onto the smart user tray, the smart user tray may interact and/or connect with the smart food station to receive prepared food transaction data corresponding to the prepared food item.

The prepared food transaction data may include identifying data relating to the prepared food item, a weight value of the prepared food item (and/or portion of the prepared food item) taken, a count of the number of the prepared food items taken (if the food item is countable), and/or the like. The prepared food transaction data may be stored within one or more memory slots of the smart user tray. Any and/or all of the foregoing may repeat for as many smart food stations the customer visits and takes prepared food items from.

Once the customer has made their selections and has taken the desired food items from the one or more food stations, the customer may proceed to a smart transaction processing station for checkout. The smart user tray may transmit the stored prepared food transaction data to the smart transaction processing station, and the smart transaction processing station and/or a server connected to the smart transaction processing station may checkout the customer.

The smart transaction processing station and/or the server may checkout the customer by (i) determining the transaction value of each prepared food item (and/or each portion of the prepared food items) based upon the prepared food transaction data, (ii) calculating a total checkout value by summing each of the transaction values, and (iii) electronically billing the customer based upon the total checkout value.

In some embodiments, a method for weight-based tracking of prepared foods for affecting checkout may be provided. The method may be implemented via one or more local or remote processors, memory units, transceivers, sensors, networks, servers, and/or other electronic or electrical components. In one instance, the method may include: (1) (a) detecting, by one or more scale devices, a change in weight of a respective prepared food item stored at each of the one or more scale devices; (2) (b) upon detecting a reduction in weight at a respective scale device, controlling, by the respective scale device, a first transceiver of the respective scale device to transmit prepared food transaction data to a second transceiver of a user tray, the prepared food transaction data indicative of food identification data and food weight-based tracking data; (3) (c) storing, by the user tray, the transmitted prepared food transaction data in a memory slot at the second transceiver of the user tray; (4) performing a)-c) at each of the one or more scale devices at which a change in weight of a respective prepared food item is detected; and (5) completing, by a transaction processing station, a checkout of the user tray by, automatically polling the second transceiver of the user tray to receive each prepared food transaction data stored at the second transceiver of the user tray, determining a transaction value for each received prepared food transaction data, obtaining a total checkout value from the one or more determined transaction values, requesting, by a payment processing system communicatively coupled to the transaction processing station, confirmation of third party payment of the total checkout value, and in response to receiving confirmation of the third party payment, transmitting, by the transaction processing station, a memory clear signal to the second transceiver of the user tray to clear the memory slot of stored prepared food transaction data.

Advantages will become more apparent to those of ordinary skill in the art from the following description of the preferred embodiments, which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 depicts an exemplary method for automated weight sensing and logging of prepared foods for checkout.

Figure 1A:
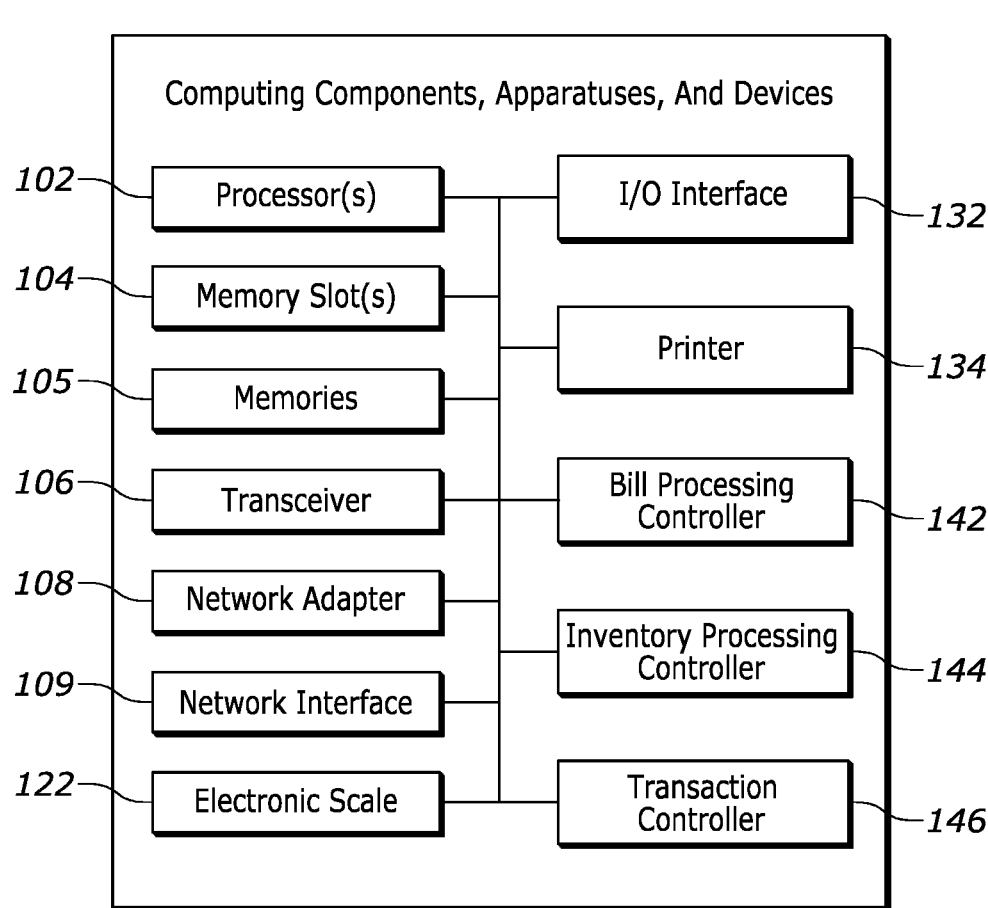
FIG. 1A depicts exemplary components, apparatuses, and devices used by devices and systems for automated weight sensing and logging of prepared foods for checkout.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Exemplary Computing Components, Apparatuses, and Devices

FIG. 1A depicts a diagram of exemplary computing components, apparatuses, and devices 100a that may be used in devices and/or systems for automated weight sensing and logging of prepared foods for checkout. The exemplary computing components, apparatuses, and devices 100a may include one or more processors 102, one or more memory slots 104, one or more memories 105, one or more transceivers 106, one or more network adapters 108, one or more network interfaces 109, one or more electronic scales 122, one or more I/O interfaces 132, one or more printers 134, one or more bill processing controllers 142, one or more inventory processing controllers 144, one or more transaction controllers 146.

The one or more processors 102 may be, or may include, a central processing unit (CPU), a graphical processing unit (GPU), a digital signal processor (DSP), an application specific integrated circuit (ASIC), a programmable logic device (PLD), a field-programmable gate array (FPGA), a field-programmable logic device (FPLD), etc.

The one or more memory slots 104 may be, or may include, any sort of local short term memory (e.g., random access memory (RAM), read only memory (ROM), cache, etc.). The one or more memory slots need not only store small bits and/or bytes of data.

The one or more memories 105 may be, or may include, one or more memory slots 104 and/or any sort of long term memory (e.g., hard disk drives (HDD), solid state drives (SSD), etc.).

The one or more transceivers 106 may be, or may include, one or more electronic tags, electronic sensors, receivers, transmitters, transceivers, and/or any combinations thereof. In various examples, the transceivers 106 herein are radio frequency identification (RFID) transceivers, including active and/or passive RFID transceivers. In other examples, the transceivers 106 herein may be any other type of wireless transceiver, such as a wireless transceiver that uses a IEEE 802.11 (WiFi) and/or Bluetooth standard, including, for example, Bluetooth Low Energy (BLE) radio transceivers or Bluetooth radio transceivers. The electric signals of the transceiver 106 described herein need not be radio frequencies (RF) nor be short range in application and/or implementation.

The one or more network adapters 108 and/or the one or more network interfaces 109 may be, or may include, a wired network adapter, connector, interface, etc. (e.g., an Ethernet network connector, an asynchronous transfer mode (ATM) network connector, a digital subscriber line (DSL) modem, a cable modem) and/or a wireless network adapter, connector, interface, etc. (e.g., a Wi-Fi connector, a Bluetooth® connector, an infrared connector, a cellular connector, etc.).

The one or more electronic scales 122 may be, or may include, any sort of digital and/or electronic analog scale that measures the weight of an object with mass.

The one or more I/O interfaces 132 may be, or may include, any number of different types of I/O units and/or combined I/O circuits and/or I/O components that enable the one or more processors 102 of the transaction processing station 120 to communicate with peripheral devices. The peripheral devices may be any desired type of device such as a keyboard, a display (a liquid crystal display (LCD), a cathode ray tube (CRT) display, touch, etc.), a navigation device (a mouse, a trackball, a capacitive touch pad, a joystick, etc.), a speaker, a microphone, a button, a communication interface, an antenna, etc.

The one or more printers 134 may be, or may include, any sort of device that may produce a physical copy of electronic data (e.g., computer printers, fax machines, receipt machines, automated typewriters, etc.).

The one or more bill processing controllers 142, the one or more inventory processing controllers 144, and/or the one or more transaction controllers 146 may be, or may include, computer-readable, executable instructions that may be stored in the one or more memories 105 and/or performed by the one or more processors 102. Further, the computer-readable, executable instructions of the one or more bill processing controllers 142, the one or more inventory processing controllers 144, and/or the one or more transaction controllers 146 may be stored on and/or performed by specifically designated hardware (e.g., micro controllers, microchips, etc.) which may have functionalities similar to the one or more memories 105 and/or the one or more processors 102.

Exemplary Devices and Systems

Figure 1B:
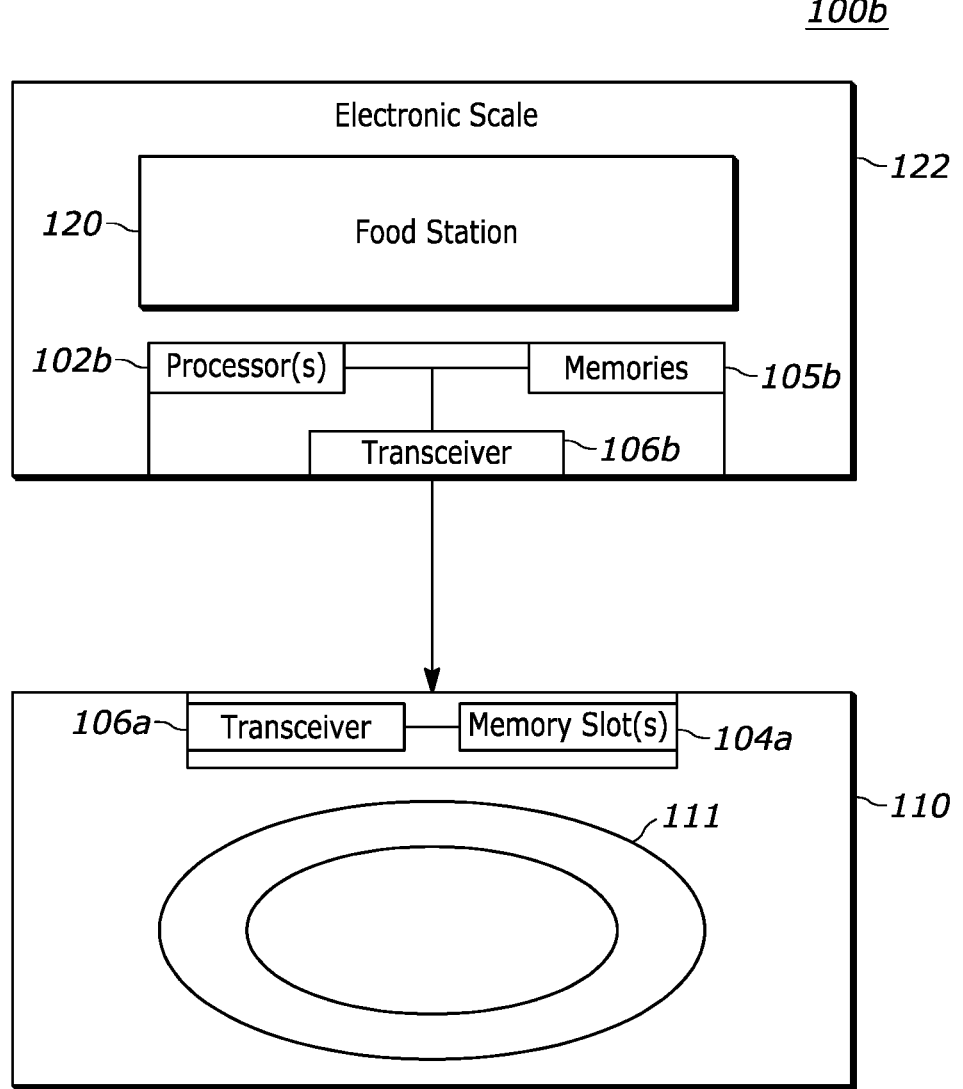
FIG. 1B depicts exemplary devices and systems including a smart food station and a smart user tray for automated weight sensing and logging of prepared foods for checkout.
Figure 1C:
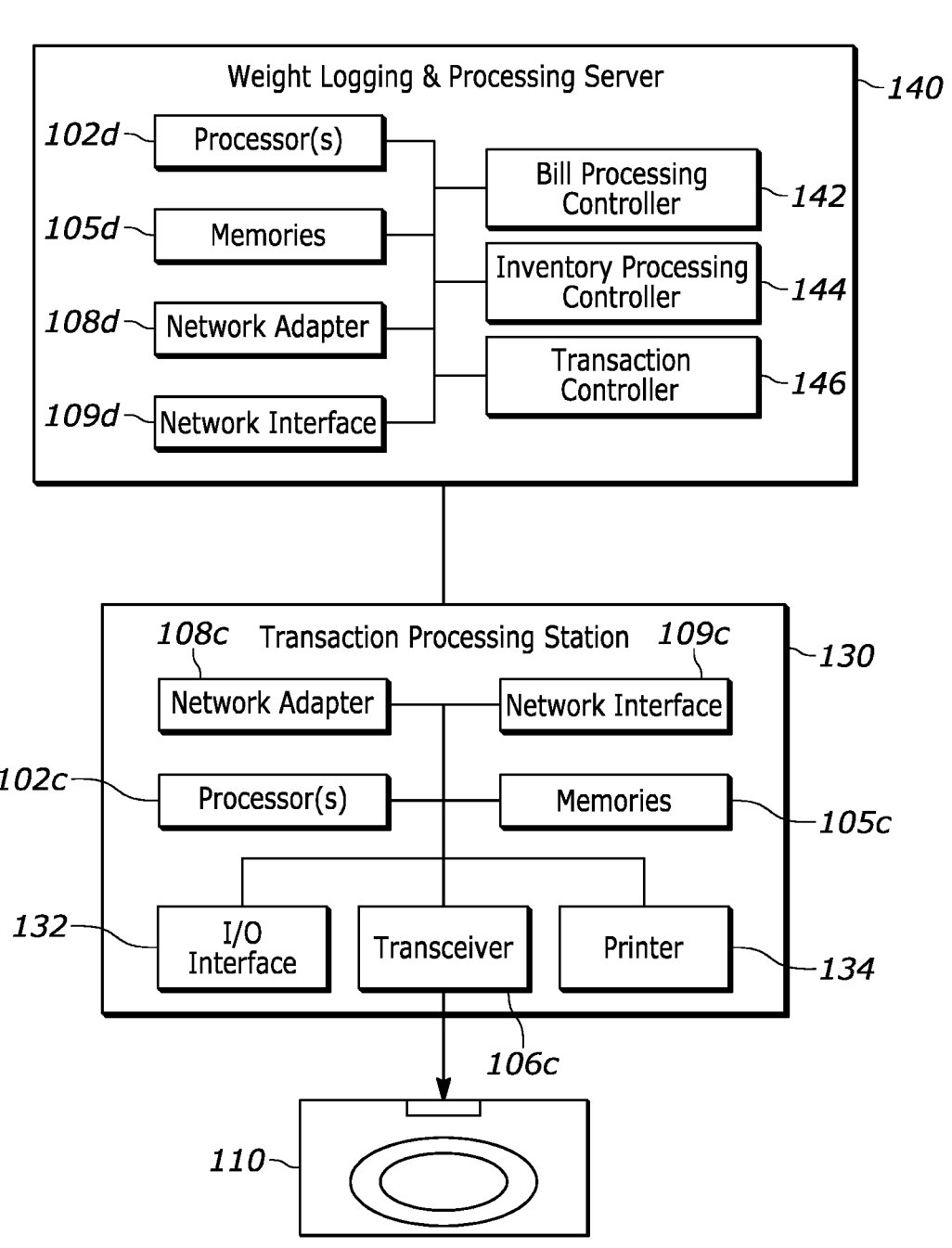
FIG. 1C depicts exemplary devices and systems including a smart user tray, a smart transaction processing station, and a weight logging and processing server for automated weight sensing and logging of prepared foods for checkout.

FIGS. 1B and 1C depict diagrams of exemplary devices and systems 100b and 100c, respectfully, to perform automated weight sensing and logging of prepared foods for checkout.

The exemplary devices and systems 100b of FIG. 1B may include a smart user tray 110 and/or a smart food station 120.

The smart user tray 110 may include one or more memory slots 104a and/or one or more transceivers 106a. For example, the transceivers 106a may be passive RFID transceivers in some examples or active RFID transceivers in other examples. In examples described, the transceivers 106a may be passive RFID transceivers activated in response to receiving RF signals from nearby transceivers such as transceivers 106b or 106c.

The one or more memory slots 104a of the smart user tray 110 may be coupled to the one or more transceivers 106a of the smart user tray 110 via any sort of omnibus. While only the one or more memory slots 104a and/or the one or more transceivers 106a of the smart user tray 110 are described herein, additional and/or alternative components of the smart user tray 110 are contemplated. For example, the smart user tray 110 may also include one or more processors 102 and/or one or more memories 105. In the illustrated example, a food plate 111 rests on a top surface of the smart user tray 110.

The smart food station 120 may include one or more processors 102, one or more memories 105b, one or more transceivers 106b, and/or an electronic scale 122. For example, the transceivers 106b may be active RFID transceivers in some examples or passive RFID transceivers in other examples. In some examples, the transceivers 106b are active RFID transceivers (thus externally powered) and send RF signals to passive RFID transceivers (e.g., the transceiver 106a) to activate the later for storing data.

The one or more memories 105b, the one or more transceivers 106b, and/or the electronic scale 122 of the smart food station 120 may be coupled to the one or more processors 102 of the smart food station 120 and/or each other via any sort of omnibus. While only the one or more processors 102b, the one or more memories 105b, the one or more transceivers 106b, and/or the electronic scale 122 of the smart food station 120 are described herein, additional and/or alternative components of the smart food station 120 are contemplated. For example, the smart food station 120 may also include a network adapter 108, a network interface 109 and/or a camera unit (not shown).

The exemplary devices and systems 100c of FIG. 1C may include the smart user tray 110, a transaction processing station 130, and/or a weight logging and processing server 140.

The transaction processing station 130 may include one or more processors 102c, one or more memories 105c, one or more transceivers 106c, a network adapter 108c, a network interface 109c, one or more input and/or output (I/O) interfaces 132, and/or one or more printers 134. The transceivers

106c may be active RFID transceivers in some examples or passive RFID transceivers in other examples. In some examples, the transceivers 106c are active RFID transceivers (thus externally powered) and send RF signals to passive RFID transceivers 106a to activate the later for sending stored data.

The one or more memories 105c, the one or more transceivers 106c, the network adapter 108c, the network interface 109c, the I/O interface 132, and/or the one or more printers 134 of the transaction processing station 130 may be coupled to the one or more processors 102c of the transaction processing station 130 and/or with each other via any sort of omnibus. While only the one or more processors 102c, the one or more memories 105c, the one or more transceivers 106c, the network adapter 108c, the network interface 109c, the I/O interface 132, and/or the one or more printers 134 of the transaction processing station 130 are described herein, additional and/or alternative components of the transaction processing station 130 are contemplated. For example, the transaction processing station 130 may also include a bill processing controller 142, an inventory processing controller 144, and/or a transaction controller 146.

The weight logging and processing server 140 may include one or more processors 102d, one or more memories 105d, a network adapter 108d, a network interface 109d, a bill processing controller 142, an inventory processing controller 144, and/or a transaction controller 146.

The one or more memories 105d, the network adapter 108d, the network interface 109d, the bill processing controller 142, the inventory processing controller 144, and/or the transaction controller 146 of the weight logging and processing server 140 may be coupled to the one or more processors 102d of the weight logging and processing server 140 and/or with each other via any sort of omnibus. While only the one or more processors 102d, the one or more memories 105d, the network adapter 108d, the network interface 109d, the bill processing controller 142, the inventory processing controller 144, and/or the transaction controller 146 of the weight logging and processing server 140 are described herein, additional and/or alternative components of the weight logging and processing server 140 are contemplated.

Exemplary Computing Environment

Figure 2:
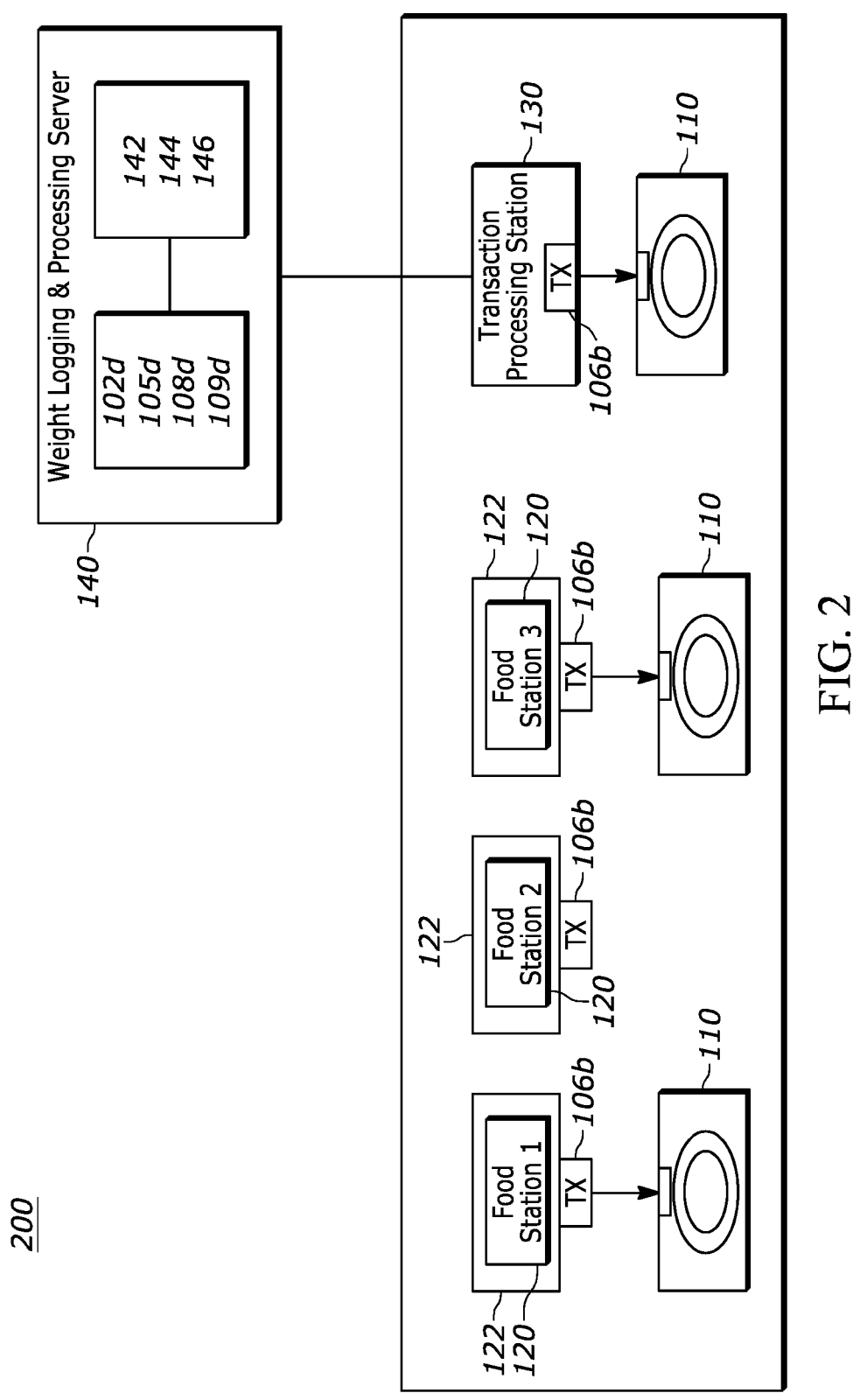
FIG. 2 depicts an exemplary environment including components and apparatuses for automated weight sensing and logging of prepared foods for checkout.

FIG. 2 depicts a diagram of an exemplary environment 200. The exemplary environment 200 may include a smart user tray 110, one or more smart food stations 120, a smart transaction processing station 130, and/or a weight logging and processing server 140.

The smart user tray 110 may interact with the one or more smart food stations 120 (as illustrated in FIGS. 1B and 2). In some embodiments, the one or more smart food stations 120 may include a detection mechanism to determine if an object (e.g., the smart user tray 110) is within a threshold distance to the one or more smart food stations 120. For example, the one or more smart food stations 120 may transmit a continuous short distance signal via the transceiver 106b. The transceiver 106a of the smart food tray 110 may detect the signal automatically transmit a short distance signal back in response to the detection. Additionally or alternatively, the detection mechanism may include one or more electronic sensors (e.g., motion detection sensors), one or more lidar sensors, one or more camera units, etc.

In some embodiments, the electronic scale 122 may detect a change in weight prior to the smart food station 120 detecting the presence of the smart user tray 110. In these embodiments, the smart food station 120 may provide an alert (e.g., an alarm sound, a message on a display, etc.) that the prepared food items (or portions thereof) are being removed without the detected presence of the smart user tray 110. This alert may be used to direct users to move the smart user tray 110 within the threshold distance to the smart food station 120 as well as alert staff of users attempting to take away prepared food items (or portions thereof) without intending to fully pay. The alert may end when either the smart user tray 110 is placed within the threshold distance such that it is detected by the smart food station 120 and/or the prepared food items (or portions thereof) are returned to the smart food station 120 such that the electronic scale 122 measures a prior change in weight.

The one or more smart food stations 120 may also identify the object once it is detected. Using the previous example, the one or more smart food stations 120 may wait for a responsive signal to determine that the object detected is the smart user tray 110. Once the one or more smart food stations 120 receive the responsive signal, they can determine that the signal most likely came from the smart user tray 110 if the responsive signal corresponds to a specific frequency range. Similarly, the other described detection mechanisms may also identify the detected object. For example, the one or more camera units may be coupled to one or more processors 102*b* capable of image recognition of one or more images captured of the object. As another example, the one or more lidar sensors may be coupled to one or more processors 102*b* capable of 3D model reconstruction of the one or more reflected and/or refracted returning electromagnetic signals.

The electronic scale 122 may continuously monitor the weight of food items stored within the one or more smart food stations 120. When a user transfers a food item stored within a smart food station 120 to the smart user tray 110, the electronic scale 122 of that specific smart food station 120 may detect a change in weight caused by the removal of the food item. For example, a smart food station 120 may hold 10 pounds of mashed potatoes and the electronic scale 122 may continue to detect the weight of 10 pounds in predetermined time periods (e.g., 10 milliseconds). The user may transfer 2 pounds of mashed potatoes from the smart food station 120 to the smart user tray 110 and the electronic scale 122 may detect the new weight of mashed potatoes to be 8 pounds.

In some embodiments, the electronic scale 122 may use various techniques to accurately determine changes in weight. For example, the electronic scale 122 coupled to the one or more processors 102*b* may wait until, over the course of a determined time period, a new constant weight value is measured as this may be indicative that the weight has no longer changed in the food item (i.e., food is no longer being removed from the smart food station 120). As another example, the electronic scale 122 coupled to the one or more processors 102*b* may detect a change in weight as a function of time and determine a period of time when the continuous rate of change is 0 (e.g., the rate of change has stopped and the weight is now at a constant value). As another example, the electronic scale 122 coupled to the one or more processors 102*b* may detect spikes in the changes in weight (e.g., the scale suddenly measuring a sharp increase due to the user exerting a downward force on the smart food station 120 as they extract the food item, the scale suddenly measuring a sharp decrease due to the sudden removal of a portion of the food item, etc.) and may follow a protocol to ignore these spikes in the measurements (e.g., based on the measured value exceeding a set threshold) to accurately assess the final change in weight. The electronic scale 122 may use any combination of these techniques and/or other techniques not described herein to accurately determine the change in weight of the food item.

Upon measuring the new weight value, the smart food station 120 may determine the difference between the newly measured weight and the previously measured weight to determine the weight of the taken portion of the food item (Aw). In some embodiments, the smart food station 120 may hold countable objects (e.g., 20 apples, 25 bananas, etc.). In these embodiments, the average weight of the item may be estimated and stored in the one or more memories 105*b* of the smart food station 120. When a change in weight is detected by the electronic scale 122, the one or more processors 102*b* of the smart food station 120 may compare the Aw to the average weight estimation to determine if the difference between the two values meets a threshold value. In the instance where multiple food items are taken (e.g., 3 apples), the smart food station 120 will compare the Aw to a multiple (e.g., 3) of average weight estimation to determine if the difference between the two values meets the threshold value. If the threshold value is met, then a counter counting the number of food items in the smart food station 120 may be decreased by an amount corresponding to the multiple to indicate the number of food items that have been removed from the smart food station 120. Conversely, if the threshold value is not met at the current multiple, the calculation can be repeated at a lower multiple (e.g., a first estimation was that 3 apples were removed, and so 3 times the average weight of an apple was estimated but did not meet the threshold value, so a second estimation of 2 times the average weight of an apple is estimated to see if it meets the threshold value). If the multiple is 1 and the threshold value is still not met, the counter may remain unaltered and the previously calculated Δw may be discarded to indicate the detected change in weight as an anomaly (e.g., a shift in weight to someone moving the food items around in the smart food station 120, etc.). In the instances where the counter has been decreased, the smart food station 120 may determine the difference between the new counter value and the previous counter value to determine the number of food items taken ($\Delta_n$).

The one or more memories 104*b* of the smart food station 120 may store data related to the prepared food items held by the smart food station 120. The data may include an identifier (e.g., a name of the prepared food item, a code and/or ID of the prepared food item, etc.), measured weight of the prepared food item, calculated Δw, calculated Δn, pricing information, etc. Some of the data may be initially entered to the one or more memories 104*b* before the smart user tray 110 interacts with the smart food station 120. In some embodiments, the initial entry of the data may be performed by one or more external components and/or device connected to the smart food station 120 and/or an interface similar to the I/O interface 132 of the transaction and processing station 130.

The smart food station 120 may transfer the data to the smart user tray 110 via the transceivers 106*b*. The transferred data may be stored within the memory slot 104*a* of the smart user tray 110. The foregoing processes may be repeated for each smart food station 120 the user visits. For each visited smart food station 120, the smart user tray 110 will store corresponding data in the memory slot 104*a* (e.g., the calculated Δw of lasagna, salad, and 3 apples; the identifiers of lasagna, salad, and 3 apples; the calculated Δn of apples, etc.).

The smart user tray 110 may interact with the smart transaction processing station 130 (as illustrated in FIGS. 1C and 2). In some embodiments, the smart transaction processing station 130 may include a detection mechanism to determine if an object (e.g., the smart user tray 110) is within a threshold distance to the smart transaction processing station 130. The detection mechanism may be any of the previously described detection mechanisms or some other detection mechanism not described herein. The smart transaction processing station 130 may also identify the object once it is detected using any of the previously described identification techniques or some other identification technique not described here.

The smart transaction processing station 130 may transmit a pull request to the smart user tray 110 via the transceiver 106c. Upon receiving the pull request, the smart user tray 110 may transmit the data stored in the memory slot 104a to the smart transaction processing station 130. Upon receiving the data, the smart transaction processing station 130 may (i) determine a list of food items taken from the one or more smart food stations 120 based upon the identifying data; (ii) calculate the value of each foot item in the list based upon the Aw and Δn data as well as the price per pound of each item; and (iii) calculate a total cost based upon the sum of the calculated values per food item.

In some embodiments, the smart transaction processing station 130 may interact with the weight logging and processing server 140 (as illustrated in FIGS. 1C and 2). The interaction may occur via a wired connection (e.g., wires, fiber optic cables, etc.) and/or a wireless connection (Wi-Fi, Bluetooth, etc.). In some embodiments, the interaction may occur over one or more networks (e.g., the internet, a local area network (LAN), a metropolitan area network (MAN), a wide area network (WAN), a wired network, a Wi-Fi network, a cellular network, a wireless network, a private network, a virtual private network (VPN), etc.). In these embodiments, one or more network connections may be enacted by the one or more network adapters 108 and/or one or more network interfaces 109 of the smart transaction processing station 130 and the weight logging and processing server 140.

Once connected, the smart transaction processing station 130 may transmit the data from the smart user tray 110 to the weight logging and processing server 140. Upon receiving the data, the weight logging and processing server 140 may (i) determine a list of food items taken from the one or more smart food stations 120 based upon the identifying data; (ii) calculate the value of each foot item in the list based upon the Aw and Δn data as well as the price per pound of each item; and (iii) calculate a total cost based upon the sum of the calculated values per food item.

Once the total cost has been calculated, the smart transaction processing station 130 may display the total cost on the I/O interface 132. In the embodiments where the total cost is calculated by the weight logging and processing server 140, the weight logging and processing server 140 may transmit the total cost to the smart transaction processing station 130 to be provided by the I/O interface 132. Once the total cost is displayed by the I/O interface 132, the user may interact with the I/O interface to enter payment (e.g., cash, coinage, checks, money orders, etc.) and/or payment information (credit card information, debit card information, etc.). In the embodiments where payment information is entered, the smart transaction processing station 130 may connect to one or more servers over the one or more networks to verify the payment information. In some embodiments, the data that payment was made and/or payment information is transmitted to the weight logging and processing server 140. In these embodiments, the weight logging and processing server 140 may also connect to one or more servers over the one or more networks to verify the payment information. The weight logging and processing server 140 may then transmit the verification back to the smart transaction processing station 130.

Once the payment has been made, and/or the payment information has been verified, the smart transaction processing station 130 may print a receipt for the user via the printer 134.

Exemplary Implementation

Figure 3:
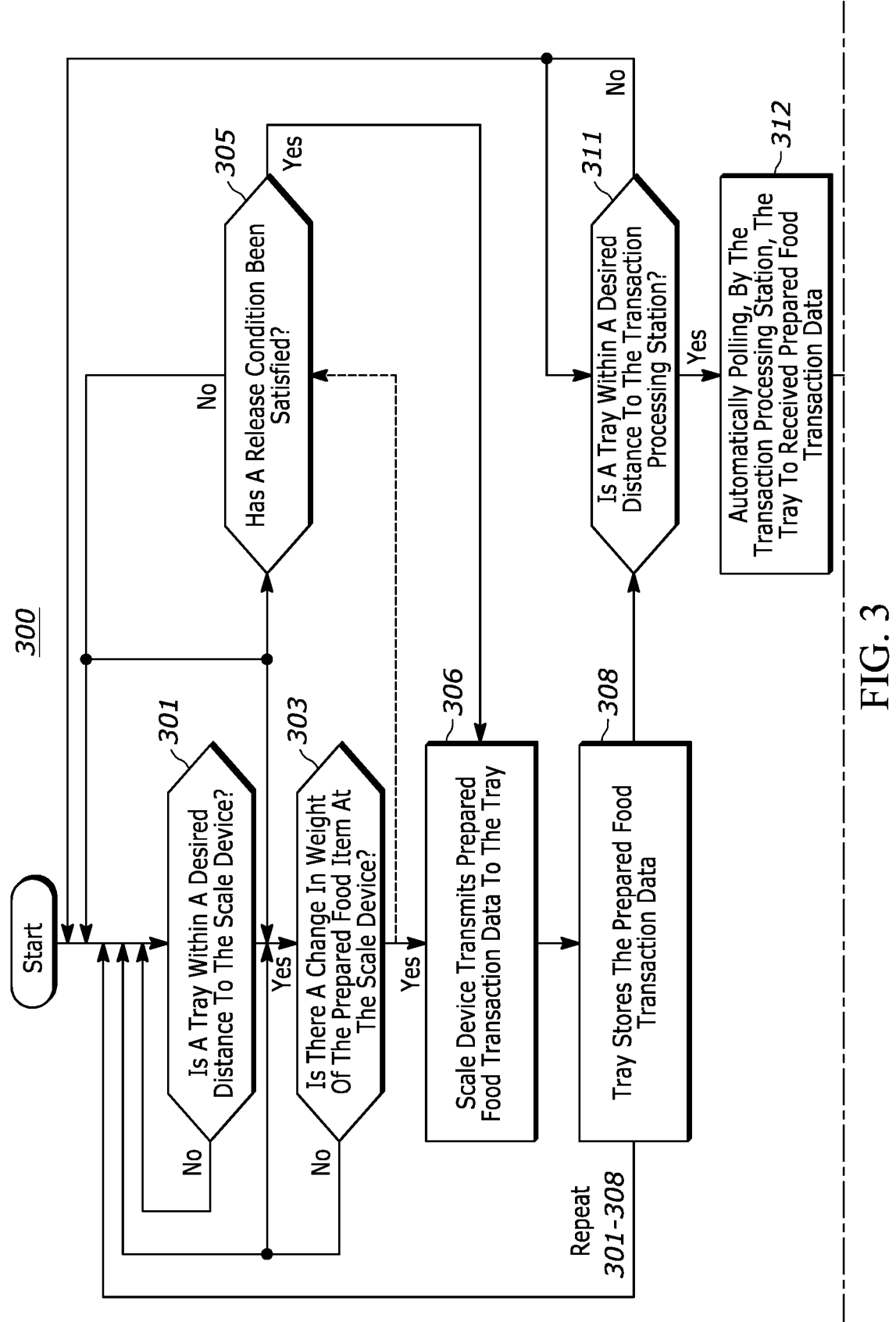
FIG. 3 depicts an exemplary flowchart representative of example methods, hardware logic, and instructions for implementing the automated weight sensing and logging of prepared foods for checkout.
Figure 3:
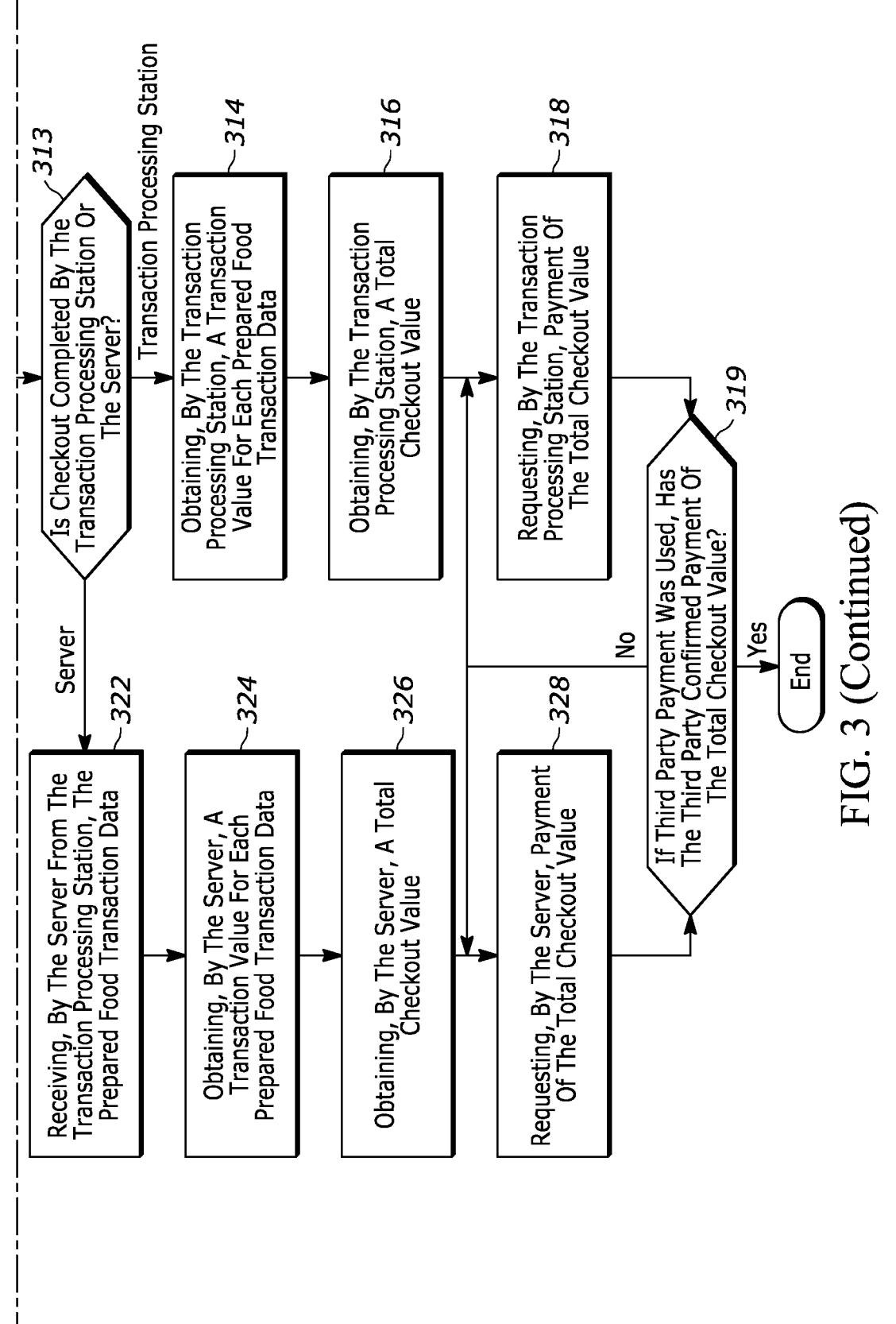

FIG. 3 depicts an exemplary method 300 for implementing automated weight sensing and logging of prepared foods for checkout. In some aspects, the method 300 may correspond to and/or be implemented by components, apparatuses, devices, and/or systems described in FIGS. 1A-2.

The processes, methods, software, and/or computer-executable instructions included within the method 300 may be, or may include, one or more executable programs and/or portions of one or more executable programs for execution by one or more processors 102. The one or more executable programs may be embodied in software or instructions stored on a non-transitory computer-readable storage medium or disk associated with the one or more processors 102. Further, although the example method 300 is described with reference to the flowchart illustrated in FIG. 3, many other methods of implementing the automated weight sensing and logging of prepared foods for checkout may alternatively be used. For example, the order of execution of the blocks may be changed, and/or some of the blocks described may be changed, eliminated, or combined.

Additionally, or alternatively, any or all of the blocks may be implemented by one or more hardware circuits (e.g., discrete and/or integrated analog and/or digital circuitry, an application specific integrated circuit (ASIC), a programmable logic device (PLD), a field programmable gate array (FPGA), a field programmable logic device (FPLD), a logic circuit, etc.) structured to perform the corresponding operation without executing software or firmware.

The exemplary method 300 of FIG. 3 may begin with one of the smart food stations 120 determining if the smart user tray 110 is within a desired distance (e.g., 3 inches) to that smart food station 120 (301). If the smart user tray 110 is not within the desired distance to the smart food station 120, the method 300 may return to the start of the method 300 at block 301 until the smart user tray 110 is within the desired distance.

If the smart user tray 110 is within the desired distance to the smart food station 120, the method 300 may proceed with the electronic scale 122 of the smart food station 120 detecting a change in weight of the food item held by the smart food station 120 (303).

The electronic scale 122 of the smart food station 120 may continuously monitor the weight of the food item, and the smart food station 120 may continuously determine whether a smart user tray 110 is within a desired distance to the smart food station 120 over a set time interval. If the weight returns to a previously measured weight at any point before block 311, the method 300 may return to either block 301 or block 303 as this return in weight may be indicative that the user returned the item they previously contemplated buying. Similarly, if the smart food station 120 determines the smart user tray 110 is not within the desired distance at any point before block 311, the method 300 may return to block 301 as this determination may be indicative that the user moved onto another smart food user station 120 without taking any of the food items or portion of the food items.

In some embodiments, if a change in weight has been detected, the method 300 may proceed with the smart food station 120 determining whether a release condition on determining the change in weight has been satisfied (305). The release condition may be (i) waiting for a constant weight value over a time period, (ii) determining a continuous rate of change in the weight to not be zero over a time period until the rate of change returns back to zero, (iii) calculating a regressive mean in the weight upon detecting spikes in the weight measurement, (iv) other release conditions not described herein, (v) a combination thereof. If the release condition is not satisfied, the method 300 may return to block 301, block 303, or block 305 until the preceding conditions are satisfied.

Once the change in weight has been detected and/or the release condition has been satisfied, the method 300 may proceed with the smart food station 120 transmitting prepared food transaction data to the smart user tray 110 (306). The prepared food transaction data may include identifying information of the food item held by the smart food station, the weight of the food item or portion of the food item taken by the user, the number of food items taken (if the food items are countable), etc. Upon receiving the prepared food transaction data, the smart user tray 110 may store the prepared food transaction data in one or more memory slots 104$a$ (308). The method 300 may repeat the forgoing steps for each smart food station 120 the user visits.

Once the user has visited all the selected smart food stations 120 and has transferred the corresponding food items and/or portions of food items onto the smart user tray 110, the method may proceed with the smart transaction processing station 130 determining if the smart user tray 110 is within a desired distance (e.g., 3 inches) to the smart transaction processing station 130 (311) to begin the checkout process. If the smart user tray 110 is not within the desired distance to the smart transaction processing station 130, the method 300 may return to block 311 until the smart user tray 110 is within the desired distance to the smart transaction processing station 130.

The smart transaction processing station 130 may continuously determine whether a smart user tray 110 is within a desired distance to the smart transaction processing station 130 over a set time interval. If the smart transaction processing station 130 determines the smart user tray 110 is not within the desired distance at any point before the end of the method 300, the method 300 may return to block 301 as this determination may be indicative that the user has decided to select another food item from one or more of the smart food user stations 120.

If the smart user tray 110 is within the desired distance to the smart transaction processing station 130, the method 300 may proceed with the smart transaction processing station 130 automatically polling the smart user tray 110 (312). Once polled, the smart user tray 110 may transmit the prepared food transaction data to the smart transaction processing station 130.

Once the smart transaction processing station 130 has received the prepared food transaction data, checkout may be completed by either the smart transaction processing station 130 or the weight logging and processing server 140 (313). If checkout is completed by the smart transaction processing station 130, the method 300 may proceed to block 314. If checkout is completed by the weight logging and processing server 140, the method may proceed to block 322.

Upon receiving the prepared food transaction data, the smart transaction processing station 130 may obtain a transaction value for each of the food items in the prepared food transaction data based upon the identifier, weight of the food item, and/or count of each food item (314). The smart transaction processing station 130 may calculate a total checkout value by summing each of the previously obtained transaction values (316). Once calculated, the smart transaction processing station 130 may display the total checkout value to the user via the I/O interface 132. Upon displaying the total checkout value, the smart transaction processing station 130 may request the user to pay the total checkout value (318).

As previously noted, in some embodiments checkout may be completed by the weight logging and processing server 140. In these embodiments, the smart transaction processing station 130 is connected to the weight logging and processing server 140. When the prepared food transaction data is transmitted from the smart user tray 110 to the smart transaction processing station 130, the smart transaction processing station 130 may transmit the prepared food transaction data to the weight logging and processing server 140 (322) instead of proceeding to block 314. Upon receiving the prepared food transaction data, the weight logging and processing server 140 may obtain the transaction value for each of the food items in the prepared food transaction data based upon the identifier, weight of the food item, and/or count of each food item (324). The weight logging and processing server 140 may calculate the total checkout value by summing each of the previously obtained transaction values (326). Once calculated, the weight logging and processing server 140 may send instructions to the smart transaction processing station 130 to display the total checkout value to the user via the I/O interface 132. Upon displaying the total checkout value, the weight logging and processing server 140 may request the user to pay the total checkout value (318).

The user may enter payment (e.g., cash) or third party payment information (e.g., debit card information, credit card information, etc.) via the I/O interface 132. If the user enters payment in an amount that equals the total checkout value, the method 300 may exit.

If the user enters third party payment information, either the transaction processing station 130 or the weight logging and processing server 140 may request confirmation of the third party payment information from the third party over the one or more networks (320). If the third party does not confirm the third party payment information (e.g., not enough funds in the third party account, faulty or damaged transaction card, lack of a network connection, etc.) the method 300 may return to the start of block 318 or the start of block 328 with the smart transaction processing station 130 or the weight logging and processing server 140 requesting the user to enter payment of the total checkout value. If the third party confirms the third party payment information, the transaction processing station 130 may transmit a memory clear signal to the smart user tray 110 so that it is ready to be used again by another user, and the method 300 may exit.

Exemplary Method

FIG. 4 depicts an exemplary method 400 for automated weight sensing and logging of prepared foods for checkout.

The method 400 may employ any of the devices, systems, and/or systems described herein with respect to FIGS. 1A-3.

The method 400 may being at block 402 by a) detecting, by one or more scale devices (e.g., the one or more smart food stations 120), a change in weight of a respective prepared food item stored at each of the one or more scale devices.

The method 400 may proceed to block 404 by b) upon detecting a reduction in weight at a respective scale device, controlling, by the respective scale device, a first transceiver (e.g., the transceiver 106) of the respective scale device to transmit prepared food transaction data to a second transceiver (e.g., the transceiver 106) of a user tray (e.g., the smart user tray 110). The prepared food transaction data may be indicative of food identification data, prepared food identification data, food weight data, prepared food weight data, and/or food weight-based tracking data. The first transceiver and/or the second transceiver may be an RFID transceiver, a Wi-Fi transceiver, or any other sort of transceiver.

The method 400 may proceed to block 406 by c) storing, by the user tray, the transmitted prepared food transaction data in a memory slot (e.g., the one or more memory slots 104*a*) at the second transceiver of the user tray.

The method 400 may proceed to block 408 by performing a)-c) at each of the one or more scale devices at which a change in weight of a respective prepared food item is detected.

The method 400 may proceed to block 410 by completing, by a transaction processing station (e.g., the smart transaction processing station 120), a checkout of the user tray. This may be performed by the transaction processing station: (i) automatically polling the second transceiver of the user tray to receive each prepared food transaction data stored at the second transceiver of the user tray; (ii) determining a transaction value for each received prepared food transaction data; (iii) obtaining a total checkout value from the one or more determined transaction values; (iv) requesting, by a payment processing system (e.g., the bill processing controller 142, the inventory processing controller 144, the transaction controller 146, a combination thereof, etc.) communicatively coupled to the transaction processing station, confirmation of third party payment of the total checkout value; and (v) transmitting, a memory clear signal to the second transceiver of the user tray to clear the memory slot of stored prepared food transaction data.

In some embodiments, the checkout of the user tray and/or portions of the checkout process may be performed by a server (e.g., the weight logging and processing server 140). In these embodiments, the server may remotely control the transaction processing station or the server may transmit instructions to transaction processing station to complete the checkout. In any case, the server may cause the transaction processing station to automatically poll the second transceiver of the user tray, the transaction processing station may transmit the prepared food transaction data to the server, the server may obtain the transaction values, the server may obtain the total checkout value, the server may request confirmation of third party payment of the total checkout value, and/or the server may cause the transaction processing station to transmit a memory clear signal to the second transceiver of the user tray.

In some embodiments, the method 400 may also include determining, by the respective scale device, that a release condition is satisfied at the respective scale device, wherein the release condition is one of a threshold weight condition or a threshold timing condition. For example, the respective scale device may determine the change in weight of the respective prepared food item stored at the respective scale device by sensing a reduction in measured weight of the respective prepared food item stored at the respective scale device compared to a previous steady state measured weight of the respective prepared food item stored at the respective scale device. As another example, the respective scale device may determine the change in weight of the respective prepared food item stored at the respective scale device by determining when the change in weight of the respective prepared food item stored at the respective scale device changes by greater than a threshold amount. As yet another example, the respective scale device may determine the change in weight of the respective prepared food item stored at the respective scale device by determining when the change in weight of the respective prepared food item stored at the respective scale device has been measured over a threshold time duration. Additionally or alternatively, the respective scale device may sense the reduction in the measured weight of the respective prepared food item stored at the respective scale device after removing spurious measured weights.

In some embodiments, the method 400 may also include: detecting, by the respective scale device, a presence of the user tray within a desired distance to the respective scale device; transmitting, by the respective scale device to the second transceiver of the user tray, the prepared food transaction data; detecting, by the first transceiver of the respective scale device, the presence of the second transceiver of the user tray; using, by the respective scale device, a proximity sensor to determine a distance between the second transceiver of the user tray and the respective scale device; and/or transmitting, by the second transceiver of the user tray to the first receiver of the respective scale device, an electronic signal.

In some embodiments, the method 400 may also include: detecting, by the transaction processing station, a presence of the user tray within a desired distance to the transaction processing station; and/or polling, by the transaction processing station, the second transceiver of the user tray by transmitting one or more data requests to the second transceiver of the user tray to receive the prepared food transaction data.

In some embodiments, the method 400 may also include: transmitting, by the transaction processing station to a server communicatively coupled to the transaction processing station, at least a portion of each received prepared food transaction data; logging, by the server, the change in weight corresponding to each prepared food transaction data; determining, by the server, the transaction value for each received prepared food transaction data; determining, by the server, the total checkout value from the one or more determined transaction values; and/or transmitting, by the server to the transaction processing station, the transaction values and the total checkout value.

Additionally or alternatively, the method 400 may include: transmitting, by the transaction processing station to a server communicatively coupled to the transaction processing station, at least a portion of each received prepared food transaction data; logging, by the server, the change in weight corresponding to each prepared food transaction data; tracking, by the server, changes in weight for each prepared food transaction over a plurality of memory clear signals; determining, by the server, the transaction value for each received prepared food transaction data; determining, by the server, the total checkout value from the one or more determined transaction values; and/or transmitting, by the server to the transaction processing station, the transaction values and the total checkout value.

Additionally or alternatively, the method 400 may include: logging, by the transaction processing station, the change in weight corresponding to each prepared food transaction data; determining, by the transaction processing station, the transaction value for each received prepared food transaction data; and/or determining, by the transaction processing station, the total checkout value from the one or more determined transaction values.

Additionally or alternatively, the method 400 may include: logging, by the transaction processing station, the change in weight corresponding to each prepared food transaction data; tracking, by the transaction processing station, changes in weight for each prepared food transaction over a plurality of memory clear signals; determining, by the transaction processing station, the transaction value for each received prepared food transaction data; and/or determining, by the transaction processing station, the total checkout value from the one or more determined transaction values.

In some embodiments, the method 400 may also include: displaying, by a display device (e.g., the I/O interface) coupled to the transaction processing system, the transaction values and total checkout value on a user interaction interface of the display device; awaiting, by the transaction processing system, user authorization for completing payment; and/or requesting, by the transaction processing system to the payment processing system, affect third party payment of the total checkout value.

The method 400 may have more or less or different steps and/or may be performed in different orders of steps.

ADDITIONAL CONSIDERATIONS

Although the text herein sets forth a detailed description of numerous different embodiments, it should be understood that the legal scope of the invention is defined by the words of the claims set forth at the end of this document. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, some embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules may provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may, at a later time, access the memory device to retrieve and process the stored output. Modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "receiving," "analyzing," "generating," "creating," "storing," "deploying," "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other.

As used herein any reference to "some embodiments" means that a particular element, feature, structure, or characteristic described in connection with the embodiment may be included in at least one embodiment. The appearances of the phrase "some embodiments" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A method for weight-based tracking of prepared food items for affecting checkout, the method comprising:
   a) detecting, by a respective scale device, a presence of a user tray within a desired distance to the respective scale device;
   b) detecting, by the respective scale device, a change in weight of a respective prepared food item stored at the respective scale device;
   c) upon detecting a reduction in weight at a respective scale device, controlling, by the respective scale device, a first transceiver of the respective scale device to transmit prepared food transaction data to a second transceiver of a user tray, the prepared food transaction data indicative of food identification data and food weight-based tracking data;
   d) storing, by the user tray, the transmitted prepared food transaction data in a memory slot at the second transceiver of the user tray;
   performing a)-d) at each respective scale device at which a change in weight of a respective prepared food item is detected; and
   completing, by a transaction processing station, a checkout of the user tray by:
      automatically polling the second transceiver of the user tray to receive each prepared food transaction data stored at the second transceiver of the user tray,
      determining a transaction value for each received prepared food transaction data,
      obtaining a total checkout value from the one or more determined transaction values,
      requesting, by a payment processing system communicatively coupled to the transaction processing station, confirmation of third party payment of the total checkout value, and
      in response to receiving confirmation of the third party payment, transmitting a memory clear signal to the second transceiver of the user tray to clear the memory slot of stored prepared food transaction data, wherein
   responsive to detecting, by the respective scale device, the change in weight of the respective prepared food item stored at the respective scale device prior to detecting, by the respective scale device, the presence of the user tray within the desired distance to the respective scale device, generating an alert.

2. The method of claim 1, wherein detecting the reduction in weight at a respective scale device, comprises:
   determining, by the respective scale device, that a release condition is satisfied at the respective scale device, wherein the release condition is one of a threshold weight condition or a threshold timing condition.

3. The method of claim 2, wherein determining that the release condition is satisfied comprises:

determining, by the respective scale device, the change in weight of the respective prepared food item stored at the respective scale device by, sensing a reduction in measured weight of the respective prepared food item stored at the respective scale device compared to a previous steady state measured weight of the respective prepared food item stored at the respective scale device.

4. The method of claim 2, further comprising:

sensing, by the respective scale device, the reduction in the measured weight of the respective prepared food item stored at the respective scale device after removing measured weights.

5. The method of claim 2, wherein determining that the release condition is satisfied comprises:

determining, by the respective scale device, the change in weight of the respective prepared food item stored at the respective scale device by determining when the change in weight of the respective prepared food item stored at the respective scale device changes by greater than a threshold amount.

6. The method of claim 2, wherein determining that the release condition is satisfied comprises:

determining, by the respective scale device, the change in weight of the respective prepared food item stored at the respective scale device by determining when the change in weight of the respective prepared food item stored at the respective scale device has been measured over a threshold time duration.

7. The method of claim 1, further comprising:

in response to detecting the presence, transmitting, by the respective scale device to the second transceiver of the user tray, the prepared food transaction data.

8. The method of claim 7, wherein detecting the presence of the user tray within the desired distance to the respective scale device comprises:

detecting, by the first transceiver of the respective scale device, the presence of the second transceiver of the user tray.

9. The method of claim 7, wherein detecting the presence of the user tray within the desired distance to the respective scale device comprises:

using, by the respective scale device, a proximity sensor to determine a distance between the second transceiver of the user tray and the respective scale device.

10. The method of claim 7, wherein detecting the presence of the user tray within the desired distance to the respective scale device comprises:

transmitting, by the second transceiver of the user tray to the first receiver of the respective scale device, an electronic signal.

11. The method of claim 1, wherein the transmitted prepared food transaction data comprises prepared food weight data and prepared food identification data.

12. The method of claim 1, wherein the first transceiver of the respective scale device is an RFID transceiver and the second transceiver of the user tray is an RFID transceiver within the user tray.

13. The method of claim 1, wherein the first transceiver of the respective scale device is a Wi-Fi transceiver within the respective scale device and the second transceiver of the user tray is a Wi-Fi transceiver within the user tray.

14. The method of claim 1, wherein automatically polling the second transceiver of the user tray comprises:

detecting, by the transaction processing station, a presence of the user tray within a desired distance to the transaction processing station; and polling, by the transaction processing station, the second transceiver of the user tray by transmitting one or more data requests to the second transceiver of the user tray to receive the prepared food transaction data.

15. The method of claim 14, wherein obtaining the transaction value comprises:

transmitting, by the transaction processing station to a server communicatively coupled to the transaction processing station, at least a portion of each received prepared food transaction data;

logging, by the server, the change in weight corresponding to each prepared food transaction data;

determining, by the server, the transaction value for each received prepared food transaction data;

determining, by the server, the total checkout value from the one or more determined transaction values; and transmitting, by the server to the transaction processing station, the transaction values and the total checkout value.

16. The method of claim 14, further comprising:

transmitting, by the transaction processing station to a server communicatively coupled to the transaction processing station, at least a portion of each received prepared food transaction data;

logging, by the server, the change in weight corresponding to each prepared food transaction data;

tracking, by the server, changes in weight for each prepared food transaction over a plurality of memory clear signals;

determining, by the server, the transaction value for each received prepared food transaction data;

determining, by the server, the total checkout value from the one or more determined transaction values; and transmitting, by the server to the transaction processing station, the transaction values and the total checkout value.

17. The method of claim 14, wherein obtaining the transaction value comprises:

logging, by the transaction processing station, the change in weight corresponding to each prepared food transaction data;

determining, by the transaction processing station, the transaction value for each received prepared food transaction data; and determining, by the transaction processing station, the total checkout value from the one or more determined transaction values.

18. The method of claim 14, further comprising:

logging, by the transaction processing station, the change in weight corresponding to each prepared food transaction data;

tracking, by the transaction processing station, changes in weight for each prepared food transaction over a plurality of memory clear signals;

determining, by the transaction processing station, the transaction value for each received prepared food transaction data; and determining, by the transaction processing station, the total checkout value from the one or more determined transaction values.

19. The method of claim 1, further comprising:

displaying, by a display device coupled to the transaction processing system, the transaction values and the total checkout value on a user interaction interface of the display device;

awaiting, by the transaction processing system, user authorization for completing payment; and in response to receiving user authorization, requesting, by the transaction processing system to the payment processing system, affect third party payment of the total checkout value.

\* \* \* \* \*